H. E. PROCUNIER.
GOVERNOR FOR IMPACT ENGINES.
APPLICATION FILED FEB. 5, 1909.
994,535.
Patented June 6, 1911.
2 SHEETS—SHEET 1.
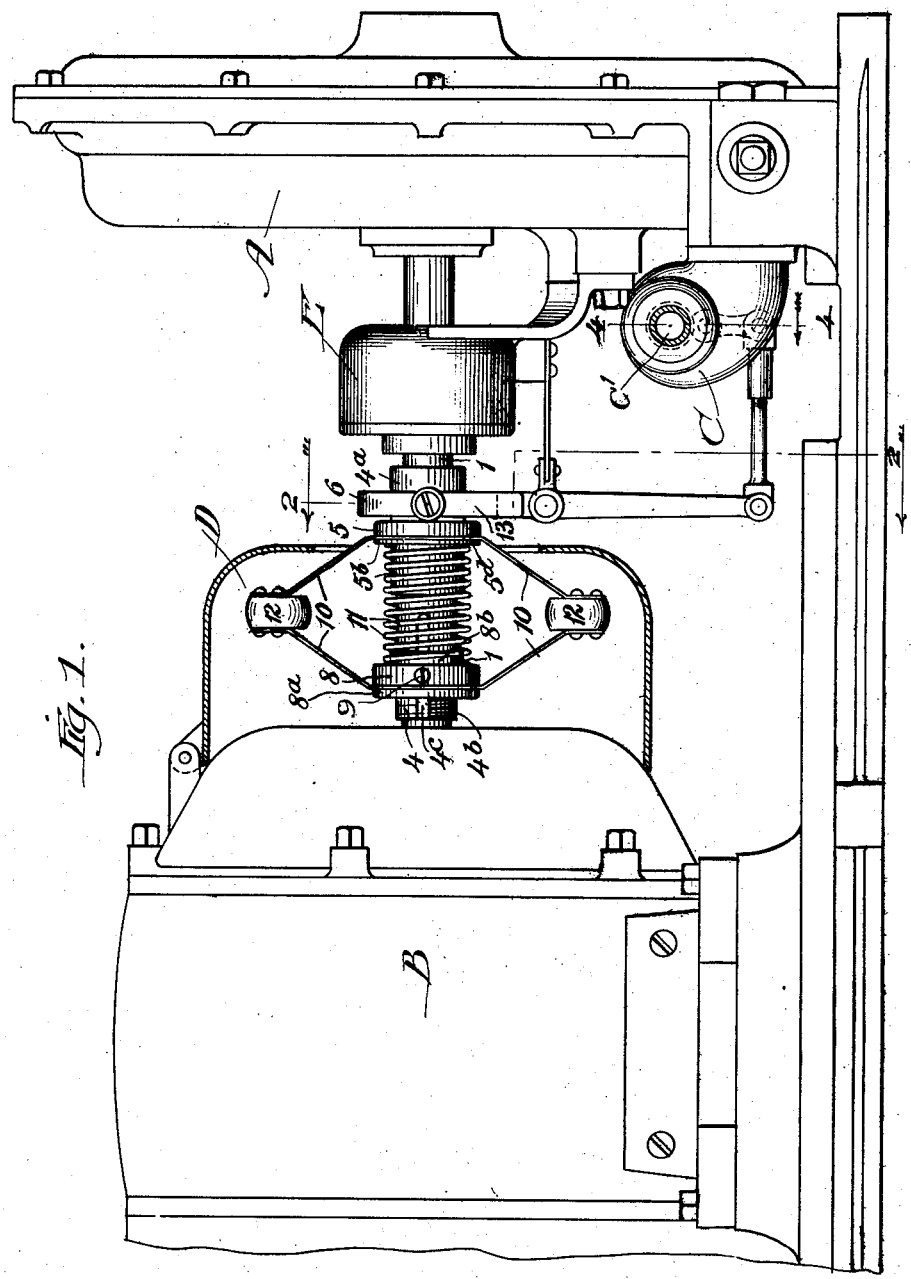
Witnesses.
Fred. J. Schad.
Julia S. Abbott
Inventor:
Henry E. Procunier
By Burton & Burton
Attorneys

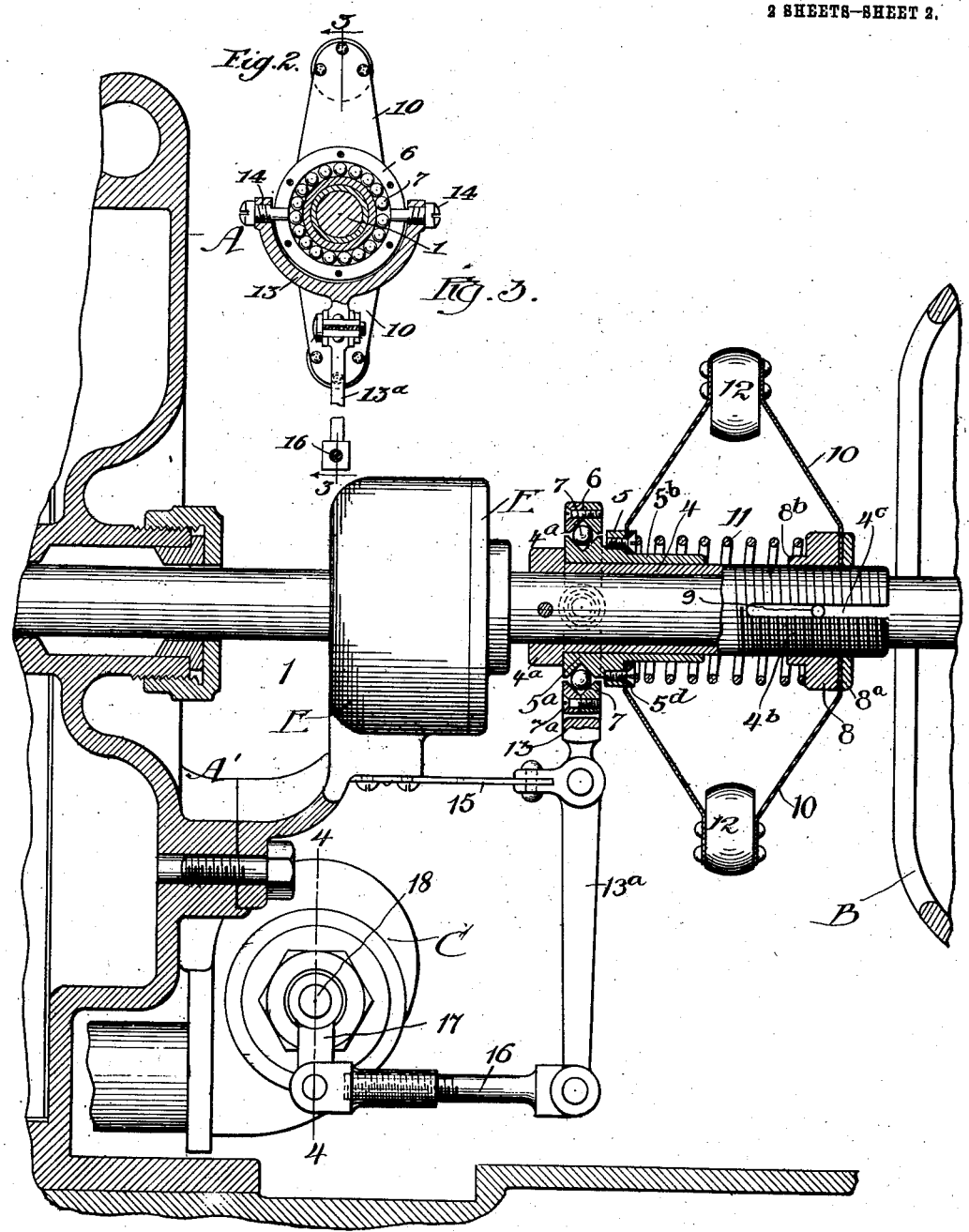

UNITED STATES PATENT OFFICE.

HENRY E. PROCUNIER, OF OAK PARK, ILLINOIS.

GOVERNOR FOR IMPACT-ENGINES.

994,535.  Specification of Letters Patent.  Patented June 6, 1911.

Application filed February 5, 1909. Serial No. 476,277.

*To all whom it may concern:*

Be it known that I, HENRY E. PROCUNIER, a citizen of the United States, residing at Oak Park, in the county of Cook and State of Illinois, have invented new and useful Improvements in Governors for Impact-Engines, of which the following is a specification, reference being had to the drawings, forming a part thereof.

The purpose of this invention is to provide an improved means for governing an impact or so-called "turbine" engine, particularly adapted for such use when the engine is the means of operating an electric generator whose rotating element is on the engine shaft.

It consists of the elements and features of construction and their combinations shown and described as indicated in the claims.

In the drawings:—Figure 1 is a partly sectional elevation of an engine and motor driven by the same embodying this invention, the casing of the governor being shown in vertical axial section. Fig. 2 is a section at the line 2—2 on Fig. 1. Fig. 3 is an axial section of the governor and connections at the line 3—3 on Fig. 2.

The particular character of the turbine wheel is not involved in this invention, and it is not illustrated in detail.

A is the casing of the turbine wheel.

B is the casing of the motor, whose details are not involved.

C is the steam supply valve casing.

D is the governor casing.

E is a ball-bearing casing and oil chamber.

1 is the engine and motor shaft having ball bearings, 2 and 3, in the engine and motor casings respectively. On the shaft, 1, between said two bearings there is mounted a sleeve, 4, pinned fast to the shaft, having a stop flange, 4ª, at one end, and exteriorly threaded from the other end back a considerable portion of its length at 4ᵇ. On the sleeve there is mounted loose for sliding on the sleeve and along the shaft, a collar, 5, which is stopped against the flange, 4ª, of the sleeve. This collar forms the inner element, 5ª, of a ball bearing whose outer element is a ring or collar, 6, the anti-friction balls between said elements being represented at 7, the said ring or collar, 6, being parted in the plane of the ball centers, the two members being secured together to close up the ball bearing as indicated by the screws, 7ª. On the threaded end, 4ᵇ, of the sleeve, 4, there is screwed a collar, 8, the threaded portion of the sleeve having two longitudinal furrows, 4ᶜ, for engagement of the reduced terminals of screws, 9, which are set through the collar, 8, for such engagement with the furrows to lock the collar against rotation on the thread, such rotation being permitted only when the screws are withdrawn sufficiently to disengage the furrows, so that the collar may be secured against rotation at intervals of a half turn on the thread. The collars, 5 and 8, constitute respectively the moving and the fixed heads of the centrifugal governing device, which comprises, in conjunction with said collars, two spring side bars, 10, 10, apertured at the middle of their length and width to admit respectively the reduced elongation or sleeve, 5ᵇ, of the collar, 5, and the threaded end, 4ᵇ, of the sleeve. The left-hand spring bar is secured to the collar, 5, by a binding ring, 5ᵈ, applied on the inner side of the bar, and the right-hand spring bar is secured to the collar, 8, by the binding ring, 8ª, applied against the collar, 8, at the outer side of the bar, said binding rings being suitably secured by screws to the collars, 5 and 8. The collar, 8, has an inwardly projecting reduced terminal or sleeve, 8ᵇ, corresponding to the sleeve, 5ª, of the collar, 5; and a coiled spring, 11, lodged at opposite ends on said sleeves respectively and stopped against the collars respectively is interposed between said collars and between the spring bars, 10, reacting to spread the collars and the bars at their middle portion. The extremities of the spring bars are connected by the weight elements, 12, of the centrifugal governor.

To the ring, 6, there is pivoted, at fixed extremities of the diameter of the ring and shaft, the fork or yoke, 13, by pintle screws, 14, 14, screwed into the ends of the fork and taking into suitable sockets in the ring diametrically situated with respect thereto. Said fork constitutes the upper end terminal of a lever, 13ª, which is pivoted just below the fork to a spring bracket, 15, secured rigidly to the engine casing. The lower end of the lever is connected by a link, 16, with the lever arm, 17, of the stem, 18, of the engine-controlling valve, which is thus rocked through a limited angle for regulating the steam inlet to the turbine. By making the bracket 15, which affords fulcrum support for the lever arm 17 in the form of a spring, accommodation is provided for the slight change in distance between the axis of the main shaft and the lever fulcrum, which occurs in the swinging of the lever by the governor, and thus avoids necessity for elongating the pivot-bearing of the lever, or fulcruming it on a pivot-link, as would otherwise be necessary. The initial tension of the spring, 11, is subject to modification by screwing the adjustable head, 8, one way or the other on the threaded portion of the sleeve, 4, effected as described upon withdrawing the screws, 9, from the furrows, 4ᶜ, and rotating the centrifugal element of the governor comprising the two heads with their spring arms, 10, and weights or connecting blocks, 12, using said arms as handles for so rotating the entire device. The minimum adjustment is one-half a revolution when only two furrows, 4ᶜ, and two screws, 9, are employed, the number of furrows and screws, or of one or the other, determining the degree of nicety to which the adjustment may be made.

A feature of advantage of the governor consisting of the spring bars, 10, arranged and connected by the weights as described, is that the greater the speed of rotation and the consequent tendency of the weights, 12, to spread centrifugally the more nearly the stress of the centrifugal pull with the weights becomes longitudinal with respect to the bars, 10, and the more largely the tensile strength of the bars comes into play for resisting the tendency to rupture. The device is notably different in this respect from common forms of spring bars for governors in which the change of form from rest to high speed is a bending of the bars, so that the higher the speed the more the bars are bent with liability to break at the limit of the bending strength, which is much lower than the limit of the tensile strength. This characteristic,—that the centrifugal pull becomes longitudinal with respect to the bars as the weights are separated by the centrifugal action,—is contributed or increased by the particular formation and connection of the spring side bars, 10, being that the attachment of said bars to the governor heads, 5 and 8, and the weights, 12, is made at parallel planes directly transverse to the axis of the shaft, said parallel planes being caused to approach each other and become more nearly coincident by the spreading of the weights and the consequent approach of the heads, so that the angles of deflection of the portions of the bars intermediate their attachments to the heads and weights respectively from the portions which are thus attached, diminish equally as the weights spread and the heads approach, approximating zero as the heads approach under the highest speed.

I claim:—

1. A governor for an expansive fluid motor, comprising, in combination with the motor shaft, two heads mounted thereon, one for sliding and the other adapted to be fixed; flat spring bars connected to said heads respectively, and weights connecting the corresponding ends of the bars remote from the heads, said bars being attached to the heads and weights respectively, at substantially parallel planes transverse to the axis of the shaft.

2. A governor for an expansive fluid motor comprising, in combination with the motor shaft, two heads mounted thereon, one for sliding and the other with the threaded connection for adjustment longitudinally of the shaft; governor side bars attached at the middle point of their length to said heads respectively, and centrifugal elements connecting the corresponding ends of the two bars; a sleeve fast on the shaft forming the immediate seat for the two heads and having at one end portion a thread for engaging the adjustable head, said sleeve having longitudinal furrows at said threaded portion and screws set through the adjustable head for engaging said furrows.

3. A governor for an expansive fluid motor, comprising, in combination with the shaft, a sleeve fast thereon; two governor heads mounted on the sleeve, one for sliding and the other by threaded connection therewith, said governor comprising flat spring bars secured to the heads respectively at planes transverse to the shaft and extending in opposite directions therefrom; weights to which the corresponding ends of the bars remote from the shaft are attached at planes substantially parallel to the planes of attachment of the bars to the heads respectively, and means for releasably securing the adjustable head against rotation at its threaded connection with the sleeve.

4. A governor for an expansive fluid motor comprising, in combination with the shaft, a sleeve fast thereon; two governor heads mounted on the sleeve, one for sliding and the other by threaded connection therewith, said governor comprising two flat spring bars apertured at the middle point of the length for receiving the shaft and sleeve and secured respectively to the two heads; weights connecting the corresponding ends of the two side bars, and means for releasably securing the adjustable head against rotation at its threaded connection with the sleeve.

5. A governor for an expansive fluid motor comprising, in combination with the shaft, a sleeve fast on said shaft; two governor heads, one screwed onto the sleeve, the other mounted for sliding thereon; a spring coiled about the sleeve and reacting between said heads to spread them apart;

flat side bars apertured at the middle point of their length for passing on to the sleeve and secured respectively to the heads; centrifugal elements connecting the corresponding ends of said flat side bars; and means for releasably securing the adjustable head against rotation at its threaded connection with the sleeve.

6. In governing mechanism for steam engines, the combination with a rotating shaft of a sleeve mounted on said shaft so as to rotate therewith, adapted to be slid longitudinally thereof by a suitable speed-responsive element; a ball-bearing consisting of a cylindrical member secured on said sleeve, a member surrounding it, and a plurality of balls between said members adapted to transmit the motion of the former longitudinally of the shaft to the latter, said last named member being adapted for attachment to a non-rotating transmission device.

7. A governor for an expansive fluid motor comprising, in combination with the motor shaft, two heads mounted thereon, one for sliding and the other with a threaded connection for adjustment longitudinally of the shaft; balanced centrifugal elements and side bars connecting them both with both heads, the seat of the threaded head being longitudinally furrowed across the thread, and said head having screws taking into such furrows for preventing relative rotation between the head and its seat and securing the head against movement longitudinally of said seat.

8. In a device of the character described, in combination with a sleeve adapted to be slid longitudinally of the rotary shaft by a suitable speed-responsive element carried thereby, of a transmission lever connected to said sleeve having a fulcrum consisting of a spring bracket secured to a rigid support.

In testimony whereof, I have hereunto set my hand, in the presence of two witnesses, at Chicago, Illinois, this 3d day of February, 1909.

HENRY E. PROCUNIER.

In the presence of—
J. S. ABBOTT,
M. GERTRUDE ADY.